United States Patent
Ishibashi et al.

(10) Patent No.: US 11,313,945 B2
(45) Date of Patent: Apr. 26, 2022

(54) RADAR DEVICE, AND METHOD OF GENERATING A RADAR IMAGE

(71) Applicant: Furuno Electric Co., Ltd., Nishinomiya (JP)

(72) Inventors: Tatsuya Ishibashi, Amagasaki (JP); Fumiya Nakatani, Toyonaka (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 266 days.

(21) Appl. No.: 16/776,271

(22) Filed: Jan. 29, 2020

(65) Prior Publication Data

US 2020/0241108 A1 Jul. 30, 2020

(30) Foreign Application Priority Data

Jan. 30, 2019 (JP) .............................. JP2019-013806

(51) Int. Cl.
*G01S 7/10* (2006.01)
*G01S 7/295* (2006.01)
*G01S 13/26* (2006.01)

(52) U.S. Cl.
CPC ................ *G01S 7/10* (2013.01); *G01S 7/295* (2013.01); *G01S 13/26* (2013.01)

(58) Field of Classification Search
None
See application file for complete search history.

(56) References Cited

U.S. PATENT DOCUMENTS

| 5,157,406 A | 10/1992 | Fujikawa et al. |
| 2011/0001661 A1 | 1/2011 | Ohnishi |
| 2017/0102457 A1* | 4/2017 | Li .............................. G01S 7/35 |

FOREIGN PATENT DOCUMENTS

| EP | 2821808 A1 | 1/2015 |
| WO | 2014042134 A1 | 3/2014 |

OTHER PUBLICATIONS

European Patent Office, Extended European Search Report Issued in Application No. 20154050.7, dated Jun. 5, 2020, Germany, 8 pages.
Takashi Yoshida, "Revised Radar technology" Japan, published on May 25, 1999, pp. 275-280.

* cited by examiner

*Primary Examiner* — Whitney Moore
(74) *Attorney, Agent, or Firm* — Alleman Hall Creasman & Tuttle LLP

(57) ABSTRACT

A radar device includes a transmitter, a receiver and processing circuitry. The transmitter transmits a first pulse signal and a second pulse signal, a pulse width of the second pulse signal being wider than a pulse width of the first pulse signal. The receiver may receive a first reception signal including a reflection signal of the first pulse signal and a second reception signal including a reflection signal of the second pulse signal. The processing circuitry may be configured to compare, in a first section that is at least partly in a distance direction, a signal intensity of the first reception signal with a signal intensity of the second reception signal, and generate a display signal based on a result of the comparison.

13 Claims, 8 Drawing Sheets

RADAR DEVICE, AND METHOD OF GENERATING A RADAR IMAGE

CROSS-REFERENCE TO RELATED APPLICATION(S)

This application claims priority under 35 U.S.C. § 119 to Japanese Patent Application No. 2019-013806, which was filed on Jan. 30, 2019, the entire disclosure of which is hereby incorporated by reference.

TECHNICAL FIELD

The present disclosure relates to a radar device, and a method of generating a radar image.

BACKGROUND

In recent years, from a viewpoint of effective use of radio wave resources, the solid-state radar device which uses a semiconductor amplifier (solid-state component) has been developed, instead of an electron tube, such as a magnetron. Since the solid-state radar device has an advantage of downsizing, free of maintenance, etc., other than narrowing the band, it is expected to be widely spread in future. Since the solid-state radar device is small in the transmission power compared with the radar device which uses the electron tube, S/N (signal to noise) ratio of a reflection signal from a distant location is lowered (its detection performance deteriorates). In order to compensate this problem, a frequency-modulated pulse signal with a large pulse width (hereinafter, referred to as the "modulated pulse signal") is transmitted, and pulse compression is carried out for the reflection signal from a target to perform processing for improving the S/N ratio of the reflection signal from the distant location (Supervised by Takashi Yoshida, "Revised Radar technology", The Institute of Electronics, Information and Communication Engineers of JAPAN, published on May 25, 1999, p.p. 275-280).

On the other hand, in case of a radar device of the type in which transmission and reception are switched with one antenna, since a transmission pulse signal transmitted to a receiver directly, reception is not possible during transmission. Moreover, if the pulse width is wide, a blind zone in which the reflection signal cannot be received is produced by the widened amount at an area near the radar device. Therefore, in order to improve the detection performance in this immediate-vicinity area, a method of alternately transmitting a modulated pulse signal with a wide pulse width and an unmodulated pulse signal with a narrow pulse width periodically is devised. In case of such a radar device, a radar image is generated based on the reflection signal of the unmodulated pulse signal in a short-distance section from the radar device, and a radar image is generated based on the reflection signal of the modulated pulse signal in a long-distance section from the radar device.

Meanwhile, a radar beacon (hereinafter, referred to as the "racon") is installed at a route buoy of a major route close to a narrow aqueduct or land coast, etc. When a pulse signal is received from a radar device mounted on a ship, the racon transmits a response signal at the same frequency as the received pulse signal. This response signal is Morse-coded by amplitude modulation, and this Morse-coded response signal is displayed, together with an echo of the racon, in a radar image in the distance direction from the echo (see FIG. 1A). Therefore, a crew can accurately grasp the route buoy etc. from the radar image also in a congested oceanic condition. As described above, the racon plays a significant role for assisting the navigation of the ship.

However, the echo based on the response signal from the racon corresponding to the modulated pulse signal is elongated in the distance direction in the radar image due to a pulse compression, and thus the response signal tends not to be displayed normally. Therefore, for a solid-state radar device described in WO2014/42134A1, the following technique is proposed. This solid-state radar device detects the existence of the response signal from the racon contained in the reception signal, and the response signal of the racon is displayed normally by expanding an area based on the unmodulated pulse signal with the narrow pulse width in the radar image, for the direction which includes the response signal of the racon.

Meanwhile, although depending on specification, the racon may not respond to the pulse signal with the wide pulse width (typically, the pulse signal having the pulse width of 2 microseconds or more). Therefore, although the racon responds to the unmodulated pulse signal with a comparatively narrow pulse width, it does not often respond the modulated pulse signal with a wider pulse width. In such a case, as illustrated in FIG. 1B, the response signal of the racon cannot be acquired in the long-distance area corresponding to the modulated pulse signal in the radar image, and the response signal will not be displayed. Note that since the solid-state radar device described in Patent Document 1 is the technology of normally displaying the response signal of the racon by detecting the response signal of the racon from the reception signal, it cannot solve in the first place the problems other than what is caused by that the response signal does not return from the racon.

SUMMARY

One purpose of the present disclosure is to provide a radar device, a method of generating a radar image, and a radar image generating program, which can more certainly receive a response signal from a transponder, such as a racon, and display the response signal in the radar image.

A radar device is provided. The radar device includes a transmitter, a receiver and processing circuitry. The transmitter is configured to transmit a first pulse signal and a second pulse signal, a pulse width of the second pulse signal being wider than a pulse width of the first pulse signal. The receiver is configured to receive a first reception signal including a reflection signal of the first pulse signal and a second reception signal including a reflection signal of the second pulse signal. The processing circuitry is configured to compare, in a first section that is at least partly in a distance direction, a signal intensity of the first reception signal with a signal intensity of the second reception signal, and generate a display signal based on a result of the comparison in the first section.

The processing circuitry may be further configured to generate the display signal in the first section based on the first reception signal when the first reception signal has a larger signal intensity than the second reception signal, and generate the display signal in the first section based on the second reception signal when the second reception signal has a larger signal intensity than the first reception signal.

The processing circuitry may be further configured to compare a signal intensity of a synthetic signal of the first reception signal and the second reception signal with the signal intensity of the first reception signal in a second section closer to a transmitting location than the first section, and generate the display signal based on a result of the comparison in the second section.

The processing circuitry may be further configured to generate the display signal in the second section based on the synthetic signal when the synthetic signal has a larger signal intensity than the first reception signal, and generate the display signal in the second section based on the first reception signal when the first reception signal has a larger signal intensity than the synthetic signal.

The first pulse signal may have a pulse width of less than 2 microseconds, and the second pulse signal may have a pulse width of 2 microseconds or longer.

The transmitter may be installed on an installation surface, and may transmit through an antenna configured to rotate in a plane parallel to the installation surface.

The first pulse signal may be an unmodulated signal and the second pulse signal may be a modulated signal.

A method of generating a radar image, and a radar image generating program may configured to cause a computer to execute the following processing, are provided. The method of generating a radar image includes transmitting a first pulse signal and a second pulse signal, a pulse width of the second pulse signal being wider than a pulse width of the first pulse signal, receiving a first reception signal including a reflection signal of the first pulse signal and a second reception signal including a reflection signal of the second pulse signal, comparing, in a first section that is at least partly in a distance direction, a signal intensity of the first reception signal with a signal intensity of the second reception signal, and generating a display signal based on a result of the comparison.

BRIEF DESCRIPTION OF THE DRAWINGS

The present disclosure is illustrated by way of example and not by way of limitation in the figures of the accompanying drawings, in which like reference numerals indicate like elements and in which.

DETAILED DESCRIPTION

Hereinafter, a radar device, a method of generating a radar image, and a radar image generating program according to one embodiment of the present disclosure will be described with reference to the drawings.

<1. Configuration of Radar Device>

Figure 1A:
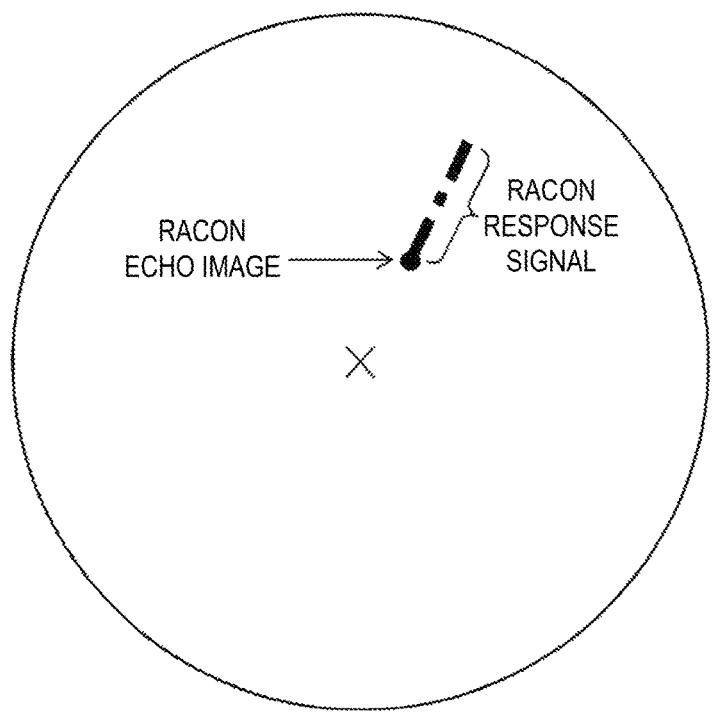
FIG. 1A is a view illustrating a radar image indicating a response signal of a racon according to a conventional technology.
Figure 1B:
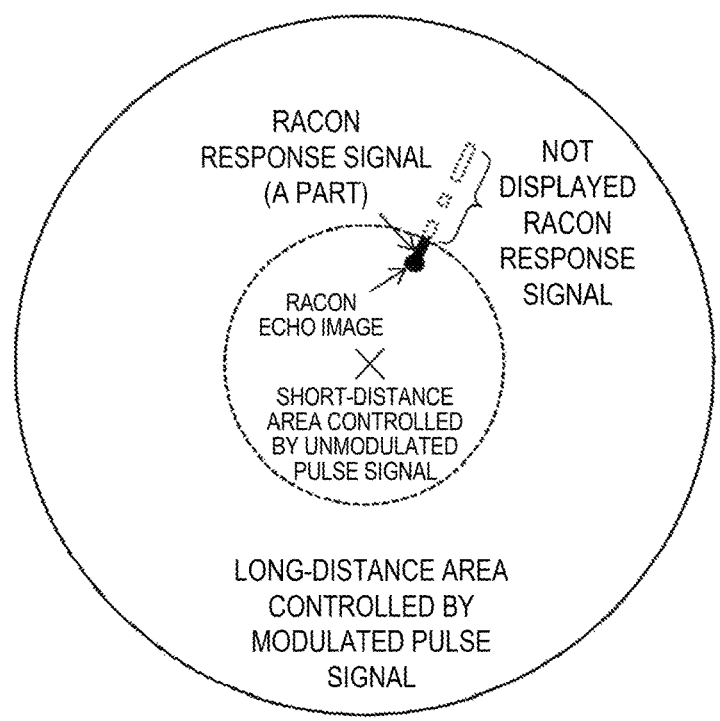
FIG. 1B is a view illustrating a radar image indicating a response signal of a racon according to another conventional technology.
Figure 2:
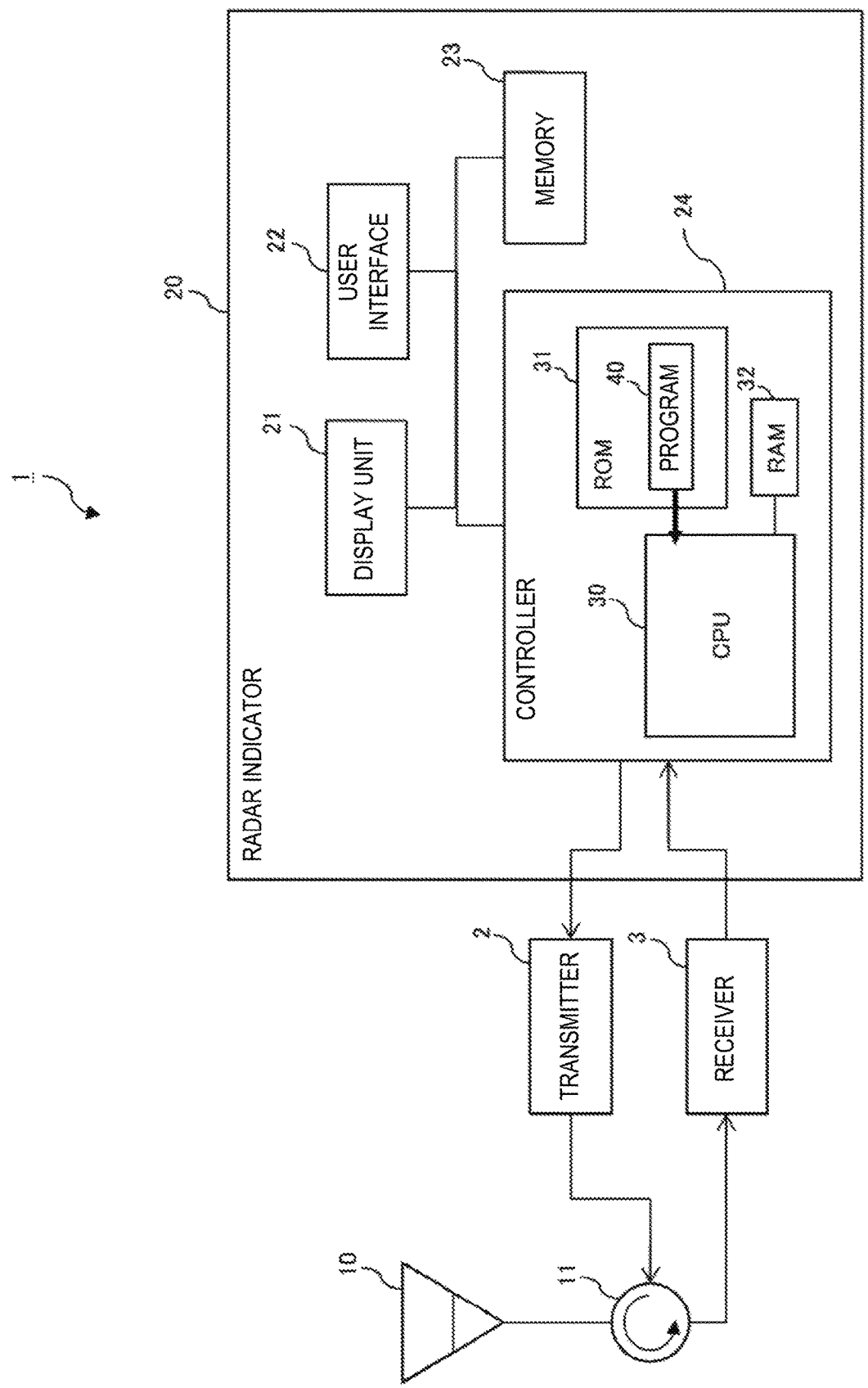
FIG. 2 is a view illustrating the entire configuration of a radar device according to one embodiment of the present disclosure.

FIG. 2 illustrates a view of the entire configuration of a radar device 1 according to this embodiment. The radar device 1 may be a device for assisting the navigation of a ship, and may be mounted on the ship. The radar device 1 of this embodiment may be a solid-state radar device which uses a semiconductor amplifier (solid-state component) instead of an electron tube, such as a magnetron, and may have advantages of narrowing band, downsizing, and free of maintenance, etc. Note that the present disclosure may be applied to ships which typically travel on water or sea which are referred to as surface ships, and may also be applied to other types of ships including boats, dinghies, watercrafts, and vessels. Further, the present disclosure may also be applied, if applicable, to submarines, aircrafts, and spaceships, as well as any types of vehicles which travel on the ground, such as automobiles, motorcycles, and ATVs.

As illustrated in FIG. 2, the radar device 1 may include a radar antenna 10, a transmitter 2 and a receiver 3 which are connected to the radar antenna 10 through a circulator 11, and a radar indicator 20 further connected to the transmitter 2 and the receiver 3. The radar antenna 10 may repeat operation of transmitting a pulse-shaped radio wave and receiving a reflection wave on a target object, while rotating in a plane parallel to an installation surface of the radar device 1, thereby scanning 360° around the ship. The radar antenna 10 may be shared for the transmission and the reception, and the transmitter 2, the radar antenna 10, and the receiver 3 may be connected to three ports of the circulator 11. The radar indicator 20 may include a display unit 21, a user interface 22, a memory 23, and a controller 24. These parts 21-24 may be mutually connected through a bus line so as to be communicatable.

The display unit 21 may be a user interface which displays a screen for mainly presenting a variety of information to a user who is a crew, and may be comprised of a liquid crystal display in this embodiment. The user interface 22 may be a user interface which receives various operations to the radar indicator 20 from the user, and may be comprised of a keyboard, a trackball, and a touch panel overlaid on the display unit 21.

The memory 23 may be a nonvolatile storage device comprised of a hard disk drive, a flash memory, etc. The controller 24 may be comprised of a CPU 30, a ROM 31, and a RAM 32, etc. The ROM 31 may store a program 40 for causing the CPU 30 to execute various operations. The CPU 30 may read and execute the program 40 in the ROM 31 to virtually operate as a transmission controlling module 24a, a signal processing module 24b, a pulse synthesizing module 24c, a comparing module 24d, and a rendering module 24e (see FIG. 3). The details of operations of these parts 24a-24e will be described later. Note that the program 40 may be stored not in the ROM 31 but in the memory 23, or may be stored distributedly in both the memory 23 and the ROM 31.

The radar device 1 which is the solid-state radar device may have small transmission power compared with the radar device which uses the electron tube. Therefore, in order to compensate a fall of an S/N ratio of a reflection signal from a distant location, the radar device 1 may transmit a modulated pulse signal with a wide pulse width which is frequency modulated, and perform a pulse compression to the reception signal acquired by the transmission. In more detail, the reception signal may be correlated with a matched filter corresponding to the modulated pulse signal to detect a peak waveform of the correlation value. Note that as for the modulated pulse signal with the wide pulse width, a blind zone may occur near the radar device 1. In order to secure a detection performance in this area, the radar device 1 may periodically transmit the modulated pulse signal with the wide pulse width and the unmodulated pulse signal with a narrower pulse width which is not frequency-modulated. Although not limited to this configuration, the unmodulated pulse signal may be implemented as a radio wave of the form called "P0N" and the modulated pulse signal may be implemented as a radio wave of the form called "Q0N" in this embodiment. Although not limited to this configuration, the pulse width of the unmodulated pulse signal may be from about 0.1 microsecond to about 1 microsecond and the pulse width of the modulated pulse signal may be from several microseconds to about tens of microseconds in this embodiment. For example, if the pulse width of the modulated pulse signal is 10 microseconds, a range of about 1,500 meters from the radar device 1 may become the blind zone. Although the details will be described later, a radar image generated in this embodiment may be mainly based on the signal intensity of the reflection signal of the unmodulated pulse signal in a short-distance area, and mainly based on the signal intensity of the reflection signal of the modulated pulse signal in a long-distance area. Note that, in this description, unless particularly described, "near (closer)" and "far (distant)" as used herein may be on the basis of the radar device 1 (a transmitting location of the pulse signal).

Figure 3:
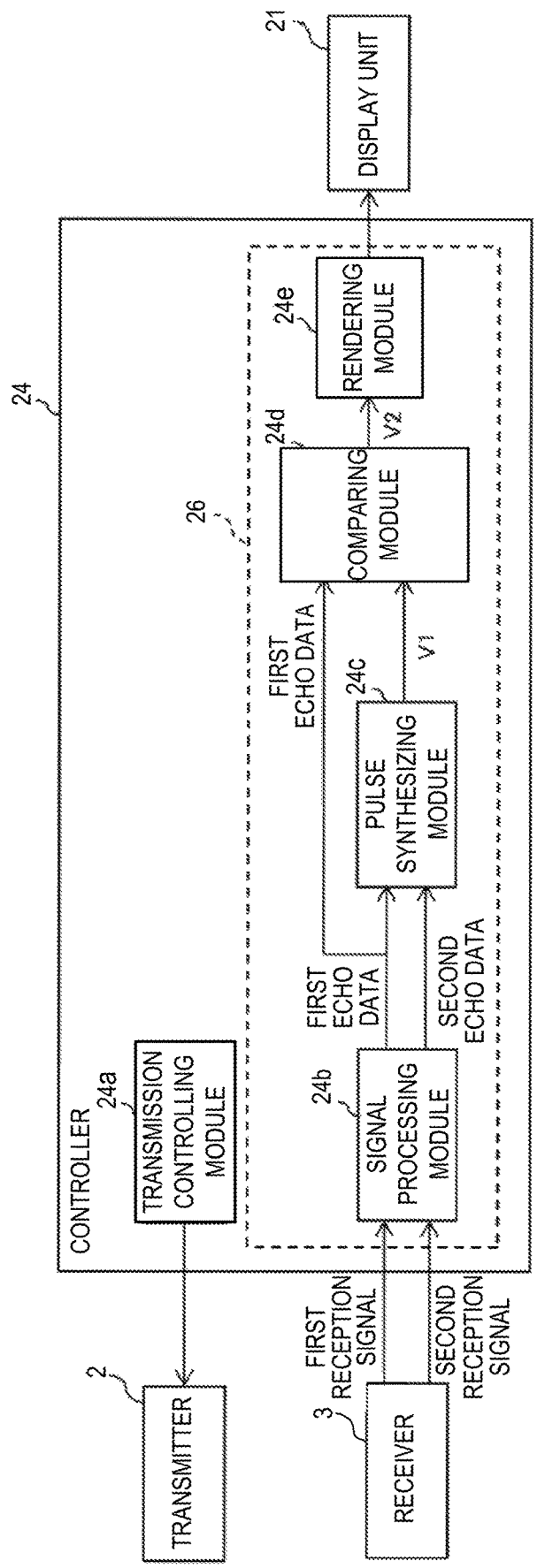
FIG. 3 is a view illustrating a configuration of a primary part according to a generation of the radar image.

FIG. 3 is a view illustrating a configuration of a primary part which performs the generation of the radar image. The transmission controlling module 24a may control operation of the transmitter 2 to control transmission and reception periods of the modulated pulse signal, and transmission and reception periods of the unmodulated pulse signal. The transmitter 2 may be comprised of a D/A converter, a mixer which upconverts the transmission signal to a desired frequency band, and an amplifier which amplifies the upconverted transmission signal. The pulse signal generated by the transmitter 2 may be supplied to the radar antenna 10 through the circulator 11. The radar antenna 10 may rotate with beam directivity. Thus, the transmitter 2 may alternately transmit the modulated pulse signal and the unmodulated pulse signal through the radar antenna 10 sequentially to various directions in the circumferential direction centering on the radar device 1.

The receiver 3 may be comprised of an amplifier which amplifies the reception signal, a mixer which downconverts a signal of a desired frequency band included in the reception signal, various filters (LPF) and an A/D converter which carry out a quadrature detection of the downconverted signal and output a complex signal. The receiver 3 may receive, through the radar antenna 10, alternately a reception signal (hereinafter, referred to as the "first reception signal") including the reflection signal of the unmodulated pulse signal which is received during a receiving period (hereinafter, referred to as the "first receiving period") of the unmodulated pulse signal, and a reception signal (hereinafter, referred to as the "second reception signal") including the reflection signal of the modulated pulse signal received during a receiving period (hereinafter, referred to as the "second receiving period") of the modulated pulse signal, sequentially from various directions in the circumferential direction centering on the radar device 1. Note that, when the racon which received the pulse signal from the radar antenna 10 transmits a response signal, the reception signal inputted into the receiver 3 may include the response signal of the racon. Here, when the pulse signal is received from the radar device, a frequency agile-type racon may transmit the response signal at the same frequency as the received pulse signal. This response signal may be Morse-coded by amplitude modulation. Depending on the specification, the racon may mainly respond to the pulse signal typically with a narrow pulse width of less than 2 microseconds, but it may not respond to the pulse signal with the wide pulse width of 2 microseconds or longer. Such a racon may return the response signal to the unmodulated pulse signal according to this embodiment, but it may not return the response signal to the modulated pulse signal with a wider pulse width. Therefore, although the first reception signal during the first receiving period includes the response signal of the racon, the reception signal of the second reception signal during the second receiving period may not include the response signal of the racon.

The signal processing module 24b may include a filter (e.g., LPF or BPF) having a pass band of a frequency width corresponding to about an inverted value of the pulse width of the unmodulated pulse signal. The signal processing module 24b may apply signal processing to the first reception signal during the first receiving period by using the filter etc. described above to extract echo data. The echo data based on the first reception signal (hereinafter, referred to as the "first echo data") may be used mainly for generating the image data of the short-distance area. However, the unmodulated pulse signal may be transmitted and received so as to cover the long-distance area as well as the short-distance area, and the first echo data may be extracted by a length not only corresponding to the short-distance area but also the long-distance area.

The signal processing module 24b may include the matched filter in which a coefficient highly correlated with the modulated pulse signal is set. The signal processing module 24b may apply signal processing including a pulse compression to the second reception signal during the second receiving period by using the matched filter etc. to extract the echo data. The echo data based on the second reception signal (hereinafter, referred to as the second echo data) may be used mainly for generating the image data of the long-distance area. Since the second reception signal which is pulse-compressed is the reflection wave of the modulated pulse signal, it may present a peak of the echo of the modulated pulse signal by the matched filter. That is, the echo with the long pulse width corresponding to the pulse width of the modulated pulse signal may be converted into one peak waveform which is pulse-compressed. The pulse-compressed peak waveform may indicate a peak level according to the pulse width of the modulated pulse signal. Since the modulated pulse signal is long in the pulse width compared with the unmodulated pulse, the S/N ratio may improve.

The pulse synthesizing module 24c may synthesize the first echo data and the second echo data outputted from the signal processing module 24b. At this time, the two kinds of echo data may be synthesized so that the first echo data forms the image data for the short-distance area and the second echo data forms the image data for the long-distance area. The pulse synthesizing module 24c may generate a first image data V1 (a display signal of the radar image) only by using the first echo data among the first echo data and the second echo data in a given short-distance section in the distance direction, and only using the second echo data in a given long-distance section in the distance direction, for each direction (see FIG. 4). Here, the given short-distance section may be a section including the center of the radar image, and may be set so as to be substantially in agreement with the blind zone of the modulated pulse signal. On the other hand, the "given long-distance section" as used herein may be a section which does not overlap with the given short-distance section and may be outwardly adjacent to the given short-distance section in the distance direction. Hereinafter, the image data generated by the pulse synthesizing module 24c may be referred to as the "first image data V1." In the radar image of FIG. 4, echoes of ships may be expressed as E1, an echo of the racon may be expressed as E2, and the response signal of the racon may be expressed as E3.

Figure 4:
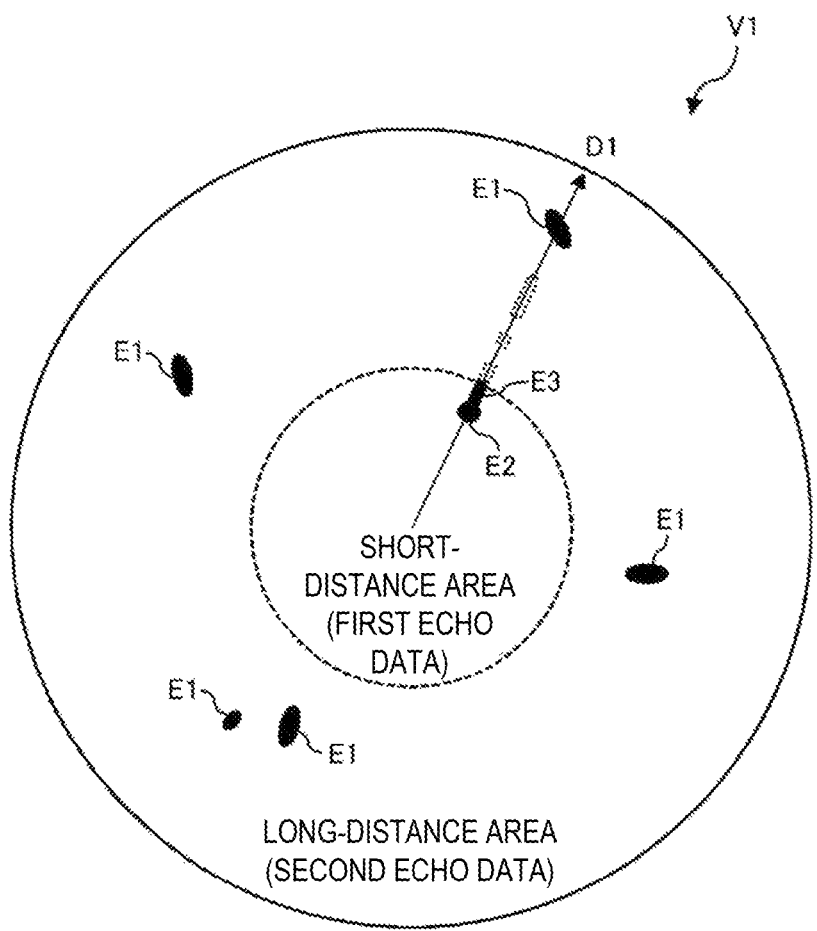
FIG. 4 is a view illustrating the radar image based on a first image data.
Figure 5:
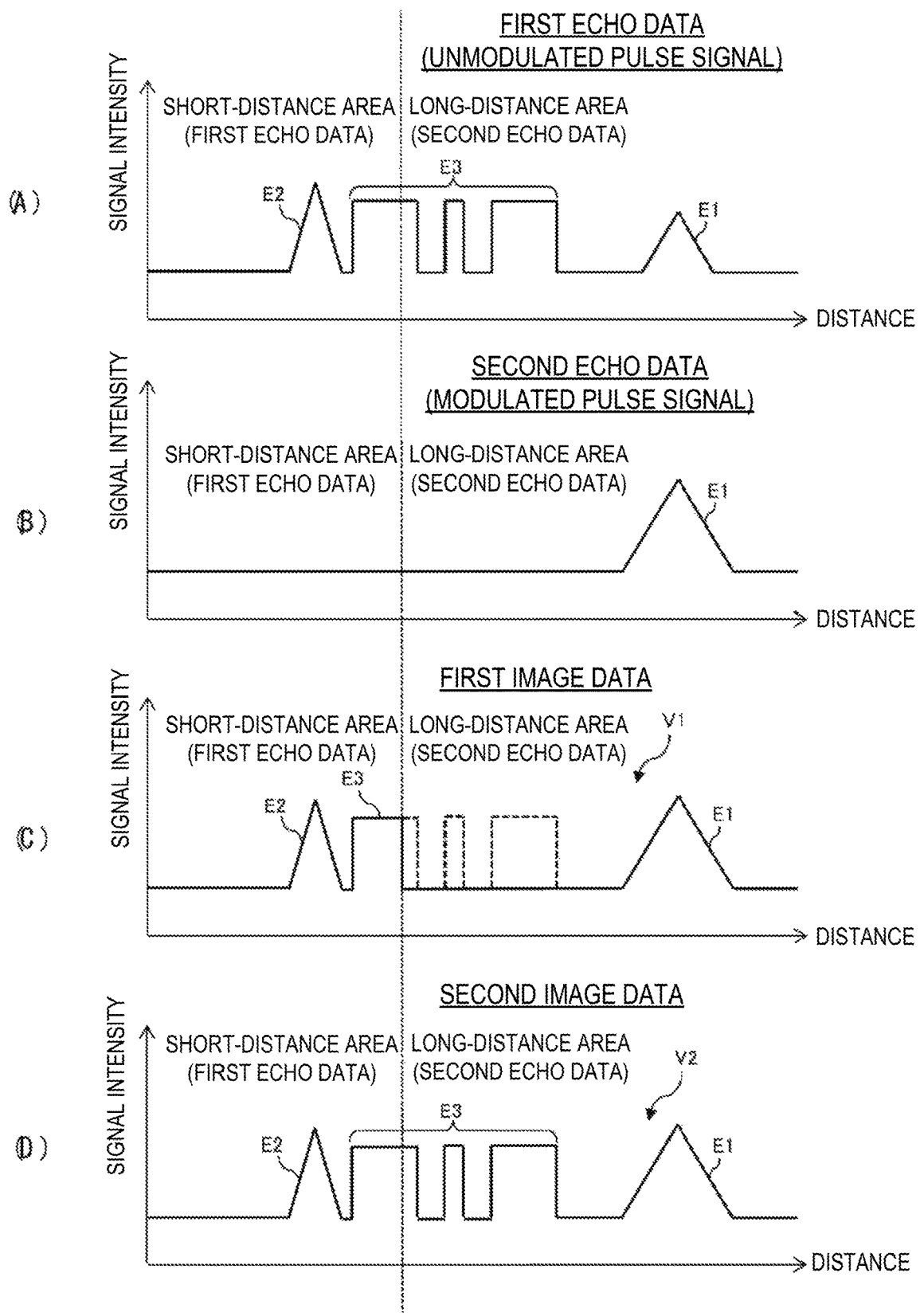
FIG. 5 illustrates graphs of waveforms, where Graph (A) is a waveform of a first echo data, Graph (B) is a waveform of a second echo data, Graph (C) is a waveform of the first image data, and Graph (D) is a waveform of a second image data.

Graph (C) of FIG. 5 illustrates a waveform of the first image data V1 in a direction indicated by an arrow D1 in FIG. 4, centering on the radar device 1. Moreover, Graphs (A) and (B) of FIG. 5 illustrate waveforms of the first echo data and the second echo data which are used as the basis of the first image data V1 of Graph (C) of FIG. 5, respectively. As having already described, as illustrated in Graph (B) of FIG. 5, the target objects which exist in the short-distance area cannot be acquired by the second echo data, and the response signal of the racon cannot also be acquired. On the other hand, as illustrated in Graph (A) of FIG. 5, the S/N ratio falls in the long-distance area for the first echo data, compared with the second echo data, and therefore, the target object is displayed smaller. On the other hand, by using the first image data V1, the target objects in the short-distance area can be displayed, and the S/N ratio in the long-distance area is improved.

However, as illustrated in FIG. 4 and Graph (C) of FIG. 5, the response signal of the racon cannot be acquired in the long-distance area by using the first image data V1. In FIG. 4 and Graph (C) of FIG. 5, the response signal which must have been displayed when the racon returned the response signal is illustrated by broken lines. Therefore, without doing anything to this configuration, the crew cannot accurately grasp the existence of the racon in the distant location.

Therefore, in this embodiment, a second image data V2 (a display signal of the radar image) which is obtained by synthesizing the first image data V1 and the first echo data may be generated. In more detail, the comparing module 24d may compare, in the long-distance section, a signal intensity of the first image data V1 with a signal intensity of the first echo data for each direction, and generate the second image data V2 based on the results of the comparisons. At this time, for each location in the distance direction within the long-distance section, the signal intensity of the first image data V1 may be compared with the signal intensity of the first echo data, and the display signal may be generated based on the larger one among both the signal intensities. That is, by determining, for each location in the distance direction within the long-distance section, which signal intensity is larger between the first image data V1 and the first echo data, and coupling each data of the larger signal intensity in the distance direction to each other, the second image data V2 in the long-distance section may be generated. On the other hand, as the second image data V2 in the short-distance section, the first image data V1 in this section may be used as it is.

Note that the "signal intensities compared" as used herein do not necessarily mean absolute signal intensities, and may mean relative signal intensities on the basis of the intensities of the echo image when converted into the echo image. That is, as for the unmodulated pulse signal and the modulated pulse signal, the pulse compression may be applied to the latter, even if the peak envelop powers are the same. For example, because of such a situation, the intensities of the echo images cannot be compared even if the absolute signal intensities are compared between the different kinds of signals. On the other hand, the "signal intensities" as used herein may be signal intensity on the basis of the intensity of the echo image indicated by the display signal converted from the signal compared. For example, if a case where the signal compared is converted into the display signal of 0 to 255 is used as one example, the comparison can be made based on the intensity of the echo image indicated by the value of 0 to 255. Alternatively, the better S/N ratio can also be determined to be the stronger signal intensity.

Figure 6:
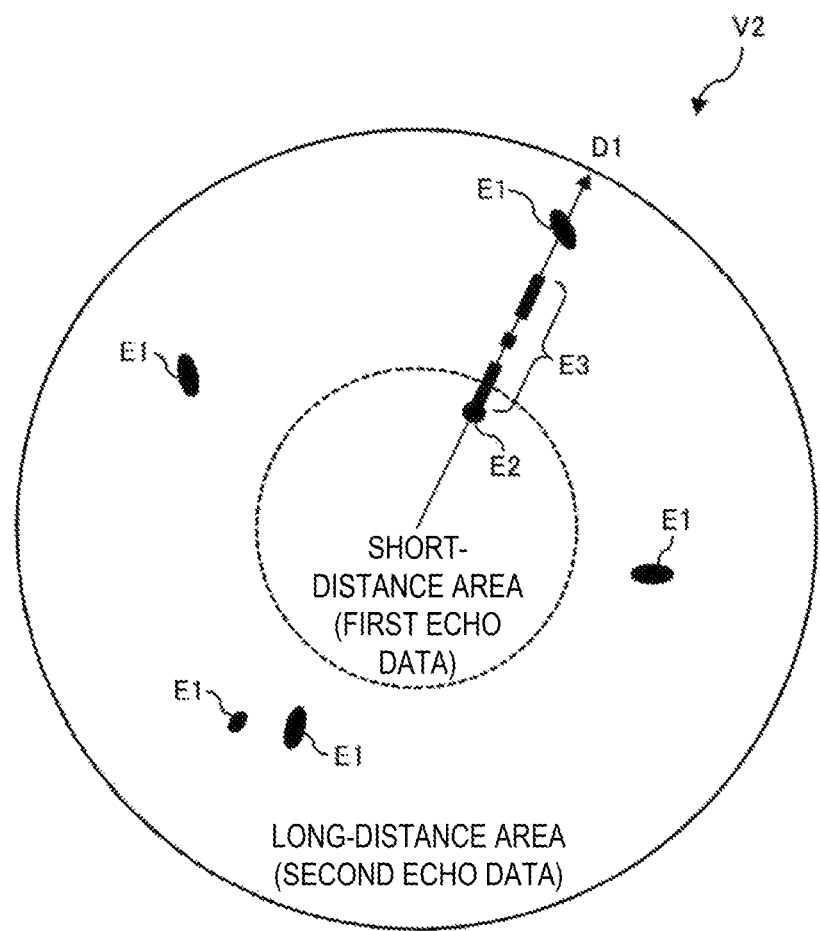
FIG. 6 is a view illustrating the radar image based on the second image data.

Graph (D) of FIG. 5 illustrates a waveform of the second image data V2 when the first echo data and the first image data V1 of Graphs (A) and (C) of FIG. 5 are synthesized. Moreover, FIG. 6 illustrates a radar image based on the second image data V2 after the above processing is applied to the first image data V1 of FIG. 4. As illustrated in Graph (D) of FIG. 5, and FIG. 6, by the second image data V2, the target object which exists in the short-distance area can be acquired based on the first echo data, and the response signal of the racon is successfully acquired based on the first echo data, regardless of the short-distance area or the long-distance area. On the other hand, since the target object which exists in the long-distance area can be acquired based on the second echo data, its S/N ratio in the long-distance area may be improved.

As described above, the second image data V2 may be generated based on the first image data V1 in the short-distance area, and based on either one of the first image data V1 or the first echo data with larger signal intensity in the long-distance area. Note that the first image data V1 in the short-distance section may be none other than the first echo data. Therefore, substantially, in the short-distance section, the second image data V2 may be generated based on the signal intensity of the first echo data, without using the second echo data. As already described, this may be because the short-distance section corresponds to the blind zone of the second echo data. Moreover, the first image data V1 in the long-distance area may be none other than the second echo data. Therefore, substantially, in the long-distance area, the first echo data may be compared with the second echo data, and the second image data V2 may be generated based on either one of the first echo data or the second echo data with larger signal intensity.

When the second image data V2 is generated, the rendering module 24e may transfer to the display unit 21 the second image data V2 outputted from the comparing module 24d, while converting it into data of a rectangular coordinate system (XY coordinate system) from data of a polar coordinate system (rθ coordinate system). The display unit 21 may display the radar image based on the second image data V2 inputted from the rendering module 24e.

<2. Generation of Radar Image>

Figure 7:
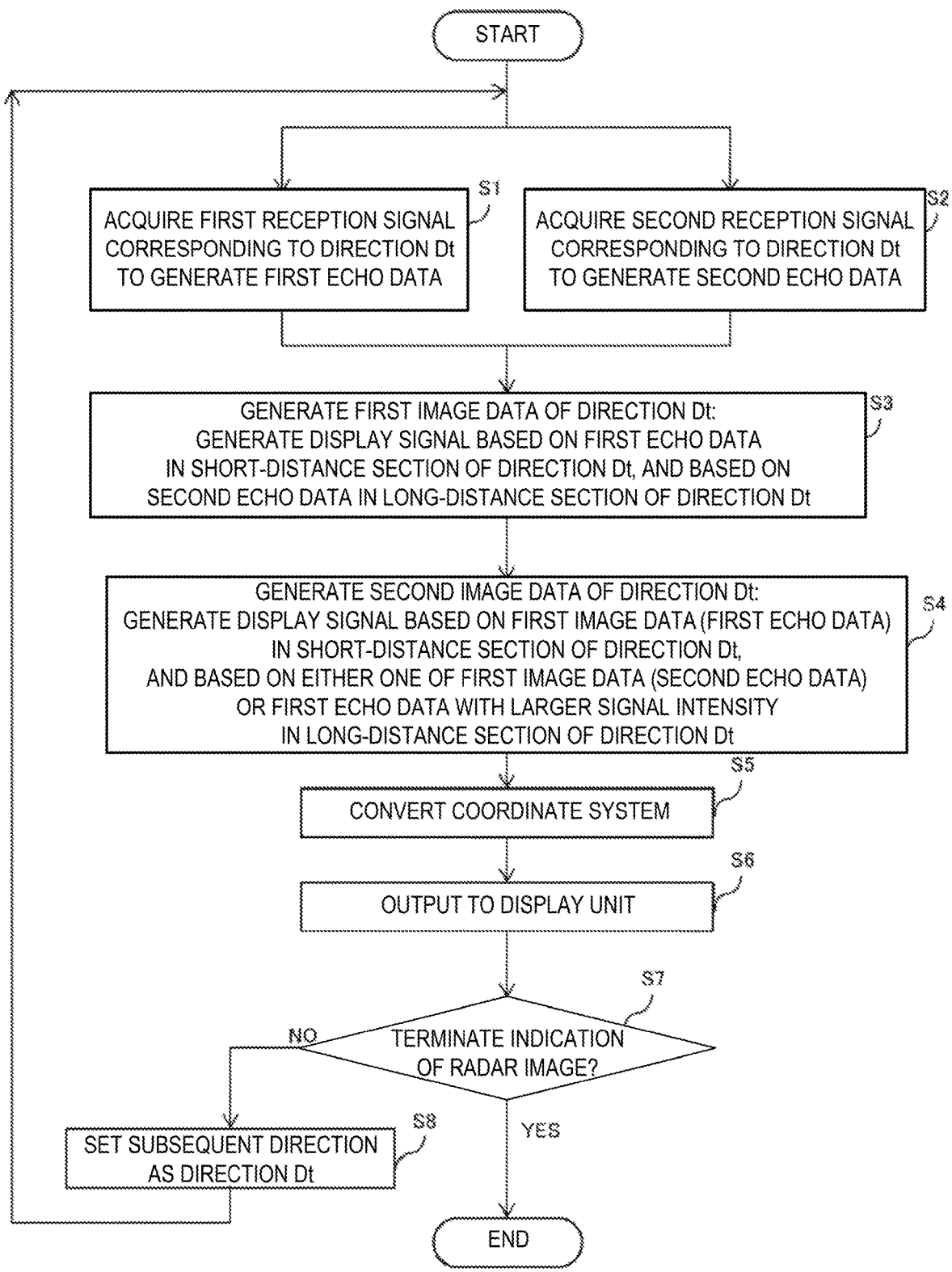
FIG. 7 is a flowchart illustrating a flow of the generation of the radar image.

As described above, the signal processing module 24b, the pulse synthesizing module 24c, the comparing module 24d, and the rendering module 24e may collaboratively operate as an image generating module (which is also referred to as processing circuitry) 26 which generates the radar image based on the first reception signal and the second reception signal which are received by the receiver 3. Below, a flow of the generation of the radar image by the image generating module 26 described above is summarized with reference to FIG. 7.

First, at Step S1, the signal processing module 24b may acquire the first reception signal received during the first receiving period, corresponding to a certain direction Dt, and may apply suitable signal processing to the first reception signal to generate the first echo data. At Step S2 which is executed in substantially parallel to Step S1, the signal processing module 24b may acquire the second reception signal received during the second receiving period, substantially corresponding to the same direction Dt, and apply suitable signal processing to generate the second echo data.

At the subsequent Step S3, the pulse synthesizing module 24c may generate the first image data V1 extending in the distance direction of the direction Dt based on the first echo data and the second echo data corresponding to the direction Dt. The display signal corresponding to the short-distance section in the distance direction of the direction Dt may be determined according to the signal intensity of the first echo data of the first image data V1. On the other hand, the display signal corresponding to the long-distance section in the distance direction of the direction Dt may be determined according to the signal intensity of the second echo data of the first image data V1. Note that a value of the display signal may be determined so that it is displayed more clearly or more deeply on a screen as the signal intensity of the echo data which is the basis of the value increases. Note that, as already described, although the display signal becomes the same value, the absolute value of the signal intensity of the first echo data which is the basis of the value may not necessarily become the same as the absolute value of the signal intensity of the second echo data.

At the subsequent Step S4, the comparing module 24d may generate the second image data V2 extending in the distance direction of the direction Dt based on the first image data V1 and the first echo data corresponding to the direction Dt. As for the part of the second image data V2 which corresponds to the short-distance section in the distance direction of the direction Dt, the first image data V1 of this section, i.e., the first echo data of this section, may be applied. That is, the display signal of the second image data V2 which corresponds to the short-distance section in the distance direction of the direction Dt may become a value determined according to the signal intensity of the first image data V1, i.e., the signal intensity of the first echo data. On the other hand, the display signal of the second image data V2 which corresponds to the long-distance section in the distance direction of the direction Dt may be determined by a comparison of the signal intensity of the first image data V1, i.e., the signal intensity of the second echo data, with the signal intensity of the first echo data. In more detail, this display signal may be determined according to the larger signal intensity, as the result of the comparison of the signal intensities. Note that the value of the display signal may be determined so as to be displayed more clearly or more deeply on a screen as the signal intensity of the image data which is the basis of the value increases.

At the subsequent Step S5, the rendering module 24e may convert the second image data V2 in the direction Dt generated at Step S4 from data of the polar coordinate system into data of the rectangular coordinate system. Then, in the subsequent Step S6, the rendering module 24e may update an image of an area of the radar image displayed on the display unit 21 which extends in the direction Dt based on the converted second image data V2 in the direction Dt.

The processing Steps S1-S6 may be repeatedly executed for the subsequent direction until a termination of the indication of the radar image is commanded by a user via the user interface 22, for example (Steps S7 and S8). Note that the subsequent direction may be a direction which is adjacent to the current direction in a rotating direction of the radar antenna 10. When the termination of the indication of the radar image is commanded, this processing may be ended.

<3. Modifications>

As described above, although one embodiment of the present disclosure is described, the present disclosure is not limited to the above embodiment and is possible to be variously changed without departing from the spirit of the present disclosure. For example, the following changes are possible. Moreover, the configurations of the following modifications may be suitably combined.

<3-1>

In the above embodiment, the generation of the radar image by the image generating module 26 may be digital processing executed by the CPU 30 which executes the program 40. However, all or part of the processing may also be executed by FPGA (Field-Programmable Gate Array) without limiting to the CPU, or may be analog-processed by analog circuitry.

<3-2>

In the above embodiment, the second image data V2 may be generated based on the first echo data in the short-distance area, and in the long-distance area, the first echo data is compared with the second echo data and the second image data V2 may be generated based on either one of the first echo data or the second echo data with larger signal intensity. However, the first echo data may be compared with the second echo data in all the sections in the distance direction, and the second image data V2 may be generated based on either one of the first echo data or the second echo data with larger signal intensity. In the short-distance area, since the signal intensity of the first echo data normally exceeds the signal intensity of the second echo data, a substantially similar radar image can be finally obtained also in this case.

<3-3>

Figure 8:
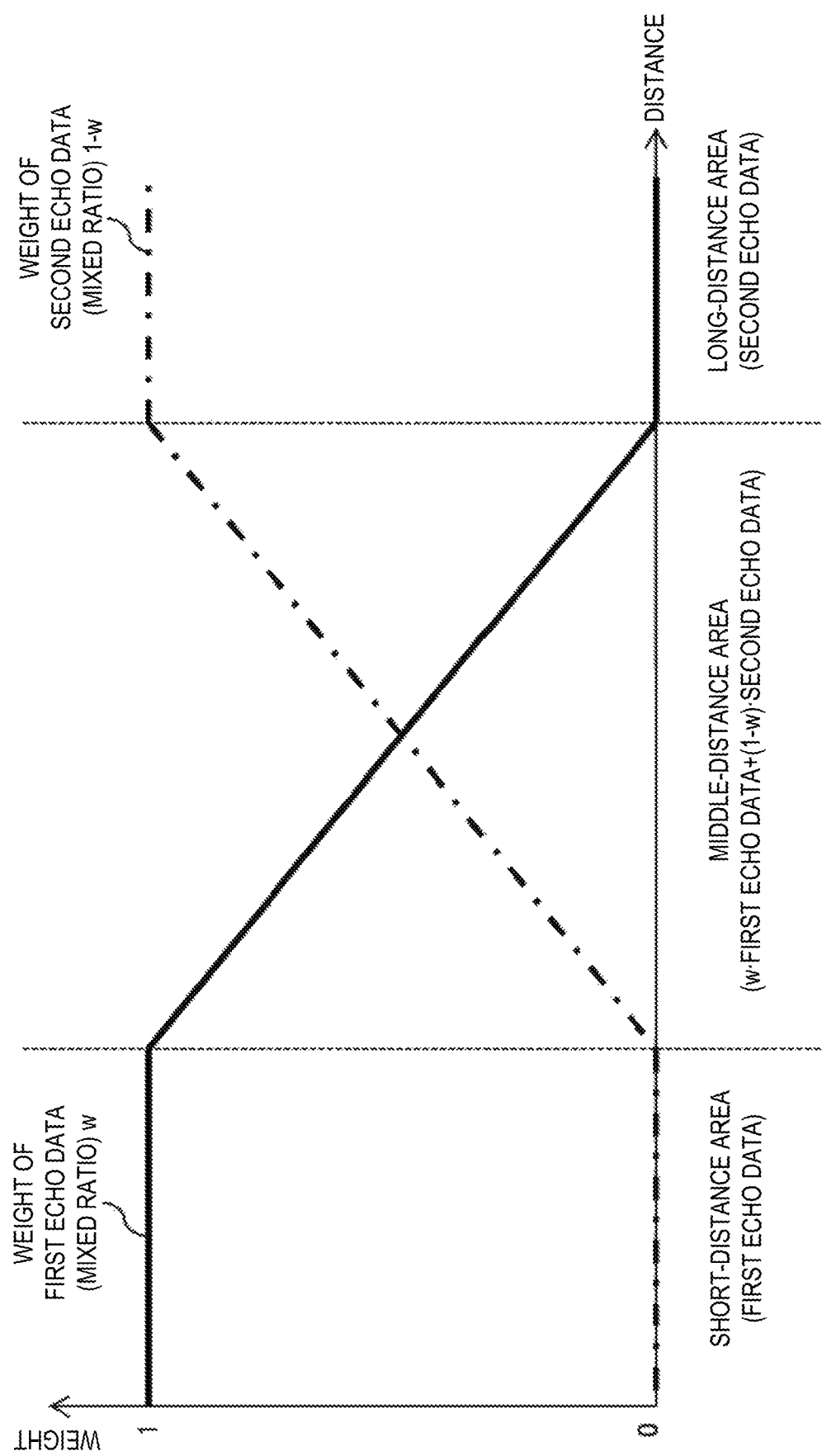
FIG. 8 is a graph illustrating a mixed ratio of the first echo data and the second echo data for generating the first image data according to one modification.

In the above embodiment, the first image data V1 may be generated based on the first echo data in the short-distance section, and based on the second echo data in the long-distance section. However, if the image based on the first echo data and the image based on the second echo data are suddenly switched therebetween in the radar image, a boundary line between both the images may be exaggerated, and therefore, an unnatural radar image may be generated as a whole. Therefore, in order to eliminate the unnatural boundary line, the first image data V1 may be generated as follows. That is, the first image data V1 can be generated based on the first echo data in the short-distance section, based on a synthetic signal of the first echo data and the second echo data in a middle-distance section, and based on the second echo data in the long-distance section. Note that the "middle-distance section" as used herein may be a section closer in the distance direction to the center of the radar image than the long-distance section and more distant from the center of the radar image than the short-distance section, and the three sections may be adjacent to each other and do not overlap with each other. The synthetic signal of the first echo data and the second echo data for the middle-distance section can be generated by adding both the data with weights according to the distances. FIG. 8 illustrates a graph illustrating the weights (mixing ratio) which can be used for the weighted addition.

In this modification, upon generating the second image data V2 (the display signal of the radar image) in each direction, for example, the comparing module 24d can compare the signal intensity of the first image data V1 with the signal intensity of the first echo data in the long-distance and middle-distance sections, and can generate the display signal based on the larger signal intensity. In this case, in the middle-distance section, the display signal of the second image data V2 may be generated according to a larger one of the signal intensity of the first image data V1, i.e., the signal intensity of the synthetic signal of the first echo data and the second echo data, and the signal intensity of the first echo data. On the other hand, in the long-distance section, the display signal of the second image data V2 may be substantially generated, similar to the above embodiment, according to the larger one of the signal intensity of the first echo data and the signal intensity of the second echo data.

<3-4>

In the above embodiment, upon generating the second image data V2 of the long-distance section (and the middle-distance section in the modification 3-3) in each direction, the signal intensity of the first echo data may be compared with the signal intensity of the first image data V1, and the display signal may be generated by selecting the larger one. However, for this section in each direction, the first echo data may be compared with the first image data V1, and the display signal of the second image data V2 may be generated by adding both the data so that the mixed ratio of the larger one becomes larger as the result of this comparison.

<Terminology>

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A radar device, comprising:
    a transmitter configured to transmit a first pulse signal and a second pulse signal, a pulse width of the second pulse signal being wider than a pulse width of the first pulse signal;
    a receiver configured to receive a first reception signal including a reflection signal of the first pulse signal and a second reception signal including a reflection signal of the second pulse signal; and
    processing circuitry configured to:
    compare, in a first section that is at least partly in a distance direction, a signal intensity of the first reception signal with a signal intensity of the second reception signal,
    generate a display signal based on a result of the comparison in the first section,
    compare a signal intensity of a synthetic signal of the first reception signal and the second reception signal with the signal intensity of the first reception signal in a second section closer to a transmitting location than the first section, and
    generate the display signal based on a result of the comparison in the second section.

2. The radar device of claim 1, wherein the processing circuitry is further configured to:
    generate the display signal in the first section based on the first reception signal when the first reception signal has a larger signal intensity than the second reception signal; and
    generate the display signal in the first section based on the second reception signal when the second reception signal has a larger signal intensity than the first reception signal.

3. The radar device of claim 1, wherein the processing circuitry is further configured to:
    generate the display signal in the second section based on the synthetic signal when the synthetic signal has a larger signal intensity than the first reception signal; and
    generate the display signal in the second section based on the first reception signal when the first reception signal has a larger signal intensity than the synthetic signal.

4. The radar device of claim 3, wherein the first pulse signal has a pulse width of less than 2 microseconds, and the second pulse signal has a pulse width of 2 microseconds or longer.

5. The radar device of claim 4, wherein the transmitter is installed on an installation surface, and transmits through an antenna configured to rotate in a plane parallel to the installation surface.

6. The radar device of claim 5, wherein the first pulse signal is an unmodulated signal and the second pulse signal is a modulated signal.

7. The radar device of claim 6, wherein the radar device is a solid-state radar.

8. The radar device of claim 1, wherein the first pulse signal has a pulse width of less than 2 microseconds, and the second pulse signal has a pulse width of 2 microseconds or longer.

9. The radar device of claim 1, wherein the transmitter is installed on an installation surface, and transmits through an antenna configured to rotate in a plane parallel to the installation surface.

10. The radar device of claim 1, wherein the first pulse signal is an unmodulated signal and the second pulse signal is a modulated signal.

11. The radar device of claim 1, wherein the radar device is a solid-state radar.

12. A method of generating a radar image, comprising:
    transmitting a first pulse signal and a second pulse signal, a pulse width of the second pulse signal being wider than a pulse width of the first pulse signal;
    receiving a first reception signal including a reflection signal of the first pulse signal and a second reception signal including a reflection signal of the second pulse signal;
    comparing, in a first section that is at least partly in a distance direction, a signal intensity of the first reception signal with a signal intensity of the second reception signal;
    generating a display signal based on a result of the comparison in the first section,
    comparing a signal intensity of a synthetic signal of the first reception signal and the second reception signal with the signal intensity of the first reception signal in a second section closer to a transmitting location than the first section, and
    generating the display signal based on a result of the comparison in the second section.

13. An apparatus comprising: a processor, and a memory having stored thereon computer-executable instructions which, when executed by the processor, cause the apparatus to:
    transmit a first pulse signal and a second pulse signal, a pulse width of the second pulse signal being wider than a pulse width of the first pulse signal;

receive a first reception signal including a reflection signal of the first pulse signal and a second reception signal including a reflection signal of the second pulse signal;

compare, in a first section that is at least partly in a distance direction, a signal intensity of the first reception signal with a signal intensity of the second reception signal; and generate a display signal based on a result of the comparison in the first section, compare a signal intensity of a synthetic signal of the first reception signal and the second reception signal with the signal intensity of the first reception signal in a second section closer to a transmitting location than the first section, and generate the display signal based on a result of the comparison in the second section.

* * * * *